S. A. REED.
APPARATUS FOR GENERATING ELECTRICITY.
APPLICATION FILED JAN. 16, 1914.
1,225,175.         Patented May 8, 1917.
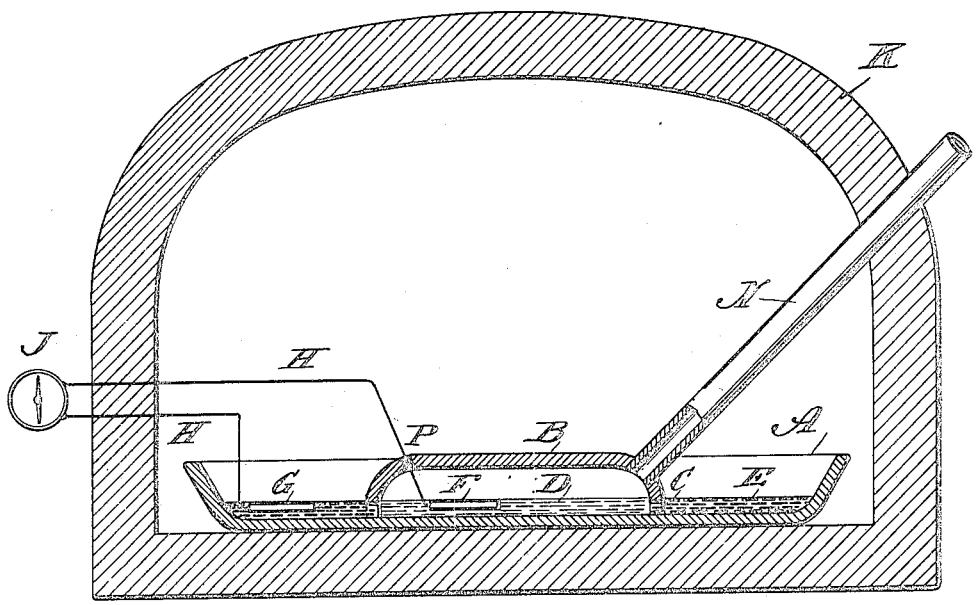

UNITED STATES PATENT OFFICE.

SYLVANUS ALBERT REED, OF NEW YORK, N. Y.

APPARATUS FOR GENERATING ELECTRICITY.

1,225,175.  Specification of Letters Patent. Patented May 8, 1917.

Application filed January 16, 1914. Serial No. 812,445.

*To all whom it may concern:*

Be it known that I, SYLVANUS ALBERT REED, a citizen of the United States, and a resident of the borough of Manhattan, city, county, and State of New York, have invented certain new and useful Improvements in Apparatus for Generating Electricity, of which the following is a full, true, and complete specification.

My invention relates to the production of electricity directly from the oxidation of fuel in a battery or cell containing a fused electrolyte, and requiring a heater or furnace to maintain fusion.

I am aware that attempts have been made to accomplish this result, but none have as yet been practically successful, and I have invented a novel method, capable of practical application.

The importance of a successful solution of this problem has been long recognized. In ordinary chemical batteries there is a consumption of costly material which precludes competition with electricity generated by dynamical means.

In the case of dynamo electrical generators operated by engines, the efficiency is low even under the most favorable circumstances, when we compare the current generated with the carbon or hydrogen consumed. If this efficiency could be raised to even 75% it would be commercially possible to expend a considerable proportion of the fuel in maintaining the fused condition of the electrolyte and in heating the air and fresh fuel and yet leave a balance largely against the engine driven generator.

The products of combustion in the fuel cell will be carbon dioxid, carbon monoxid or water. If it is carbon dioxid, an alkaline electrolyte will become rapidly altered in chemical composition and will therefore need replacement, and it has been recognized that a neutral or acid electrolyte is preferable, and I prefer to utilize a fused silicate or borate and have found that ordinary borax is convenient and effective.

The principle of my method is to dissolve under certain conditions hereinafter set forth in the electrolyte the oxid of some metal which forms easily two or more oxids of different degrees of oxidation readily passing from a lower to a higher degree of oxidation or vice versa, namely, a higher oxidation when in contact with air or any other suitable oxygen containing gas, and a lower when in contact with a so-called reducing agent, such as the ordinary fuels, solid liquid or gaseous. When the solutions of a higher and a lower oxid are brought into liquid contact at any point, a difference of electrical potential results, and if an appropriate electrode is immersed in each of the solutions a current of electricity will pass in a conductor joining them, so long as the difference of oxidation respectively in the two solutions is maintained. I maintain such difference by exposing one solution to the air or oxygen and the other to coal, coke, fuel-gas or other reducing material. The possibility of liberal generation of current depends mainly upon such disposition of the electrolyte as to subject it to the maximum contact respectively with the oxidizing and reducing agencies and the easy liberation in the reduction region of the products of fuel oxidation, and I have found such condition in extension of the surfaces exposed to contact with the air and with the reducing material.

The current obtained when the electrodes are of platinum and the metallic oxid in solution is an oxid of manganese, is approximately one volt, and current is furnished from 15 amperes per square foot of active surface and upward.

The drawing shows the preferred embodiment of the invention. K is a heated chamber maintained in a heated state by any suitable means. A is a shallow dish of refractory earthenware, B a smaller inserted shallow dish of similar material. N is a tube supplying fuel gas. P is a vent for the products of combustion. G and F are electrodes, H a conductor, and J a galvanometer or other translating instrument in circuit therewith. D is an electrolyte containing manganese dioxid, and E an electrolyte containing a lower oxid of manganese, such as monoxid, both communicating at one or more orifices C, below the level of the liquid and constituting in effect a single electrolyte.

This electrolyte is fused borax, which is an acid salt with manganese dioxid dissolved therein, the portion E becoming partly or wholly a lower oxid of manganese, while the portion D becomes a higher oxid of manganese, as the result of the reaction which takes place.

So long as fuel gas is supplied to the tube N, the normal differentiation of the two oxids is maintained and a current flows continuously through the circuit. The oxygen which oxidzes the fuel is actually supplied electrolytically from the air taken up at the extended surface E, such air being present inside the heated chamber K.

By the use of the shallow receptacle, an extended surface is exposed to such air, with the least mass of electrolyte, and consequently with the minimum provision for maintaining the fused condition.

Having described my invention, what I claim is:

1. In a carbon or hydrogen consuming cell, means of subjecting an extended surface of a fused acid electrolyte containing a metallic oxid reducible to a lower degree of oxidation, to an oxygen containing gas in an oxidizing region and to carbon or hydrogen in a reduction region, an electrode in conductive contact with the electrolyte in the oxidizing region, an electrode in conductive contact with the electrolyte in the reduction region, a circuit including said electrodes, and means for maintaining the electrolyte in the fused condition.

2. In a carbon or hydrogen consuming cell, means of subjecting an extended surface of a fused acid electrolyte containing a metallic oxid reducible to a lower degree of oxidation to an oxygen containing gas in an oxidizing region and to carbon or hydrogen in a reduction region, the regions being in open communication below the surface of the electrolyte only, an electrode in conductive contact with the electrolyte in the oxidizing region, an electrode in conductive contact with the electrolyte in the reduction region, a circuit including said electrodes, and means for maintaining the electrolyte in the fused condition.

3. In a fuel consuming cell of the kind described, the combination of electrodes, means for supplying fuel independent of the electrodes, and a fused acid electrolyte comprising manganese in different stages of oxidation.

In testimony whereof, I have signed this specification in the presence of two witnesses.

S. ALBERT REED.

Witnesses:
  G. A. TAYLOR,
  K. L. GRANT.